April 1, 1930.  J. J. WHARAM  1,752,516
BRAKE
Filed Sept. 10, 1927   2 Sheets-Sheet 1
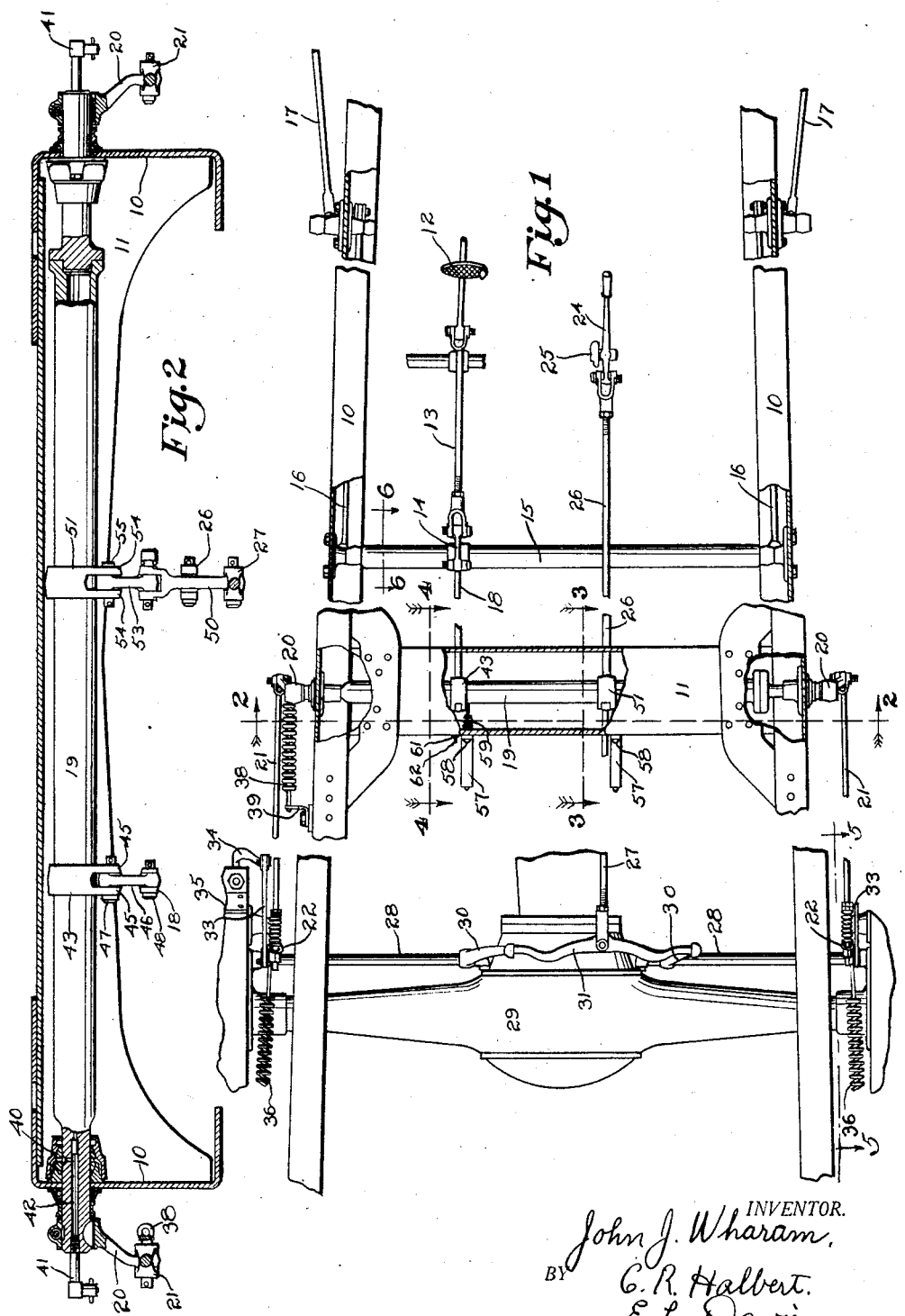
INVENTOR.
John J. Wharam,
BY C. R. Halbert.
E. L. Davis.
ATTORNEYS.

April 1, 1930.                    J. J. WHARAM                    1,752,516
                                     BRAKE
                          Filed Sept. 10, 1927          2 Sheets-Sheet 2
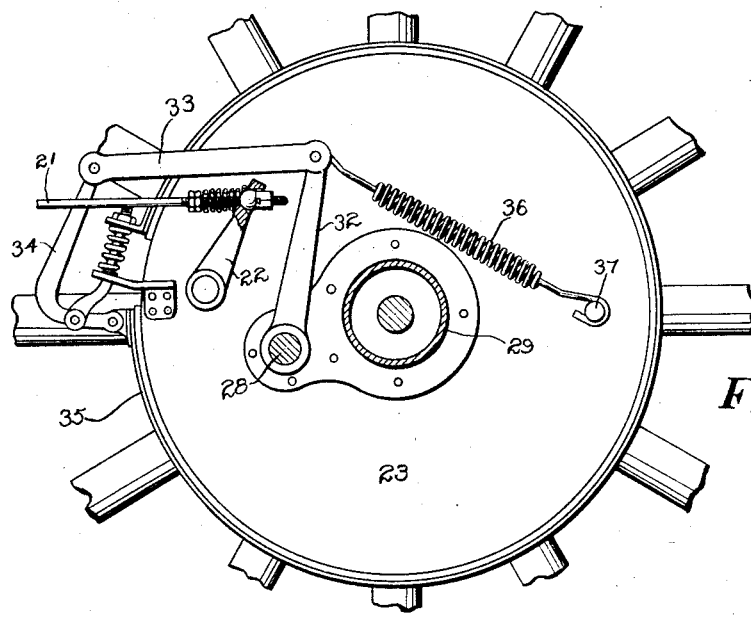
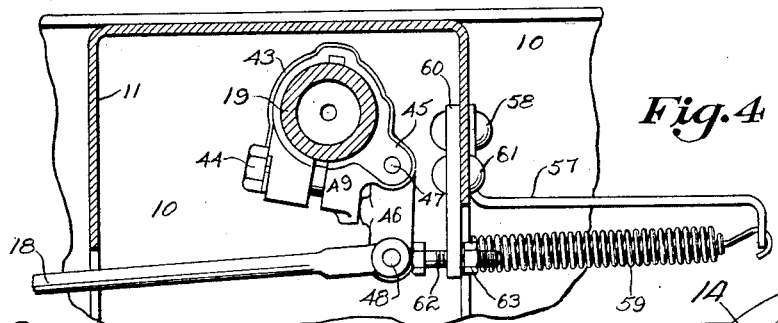
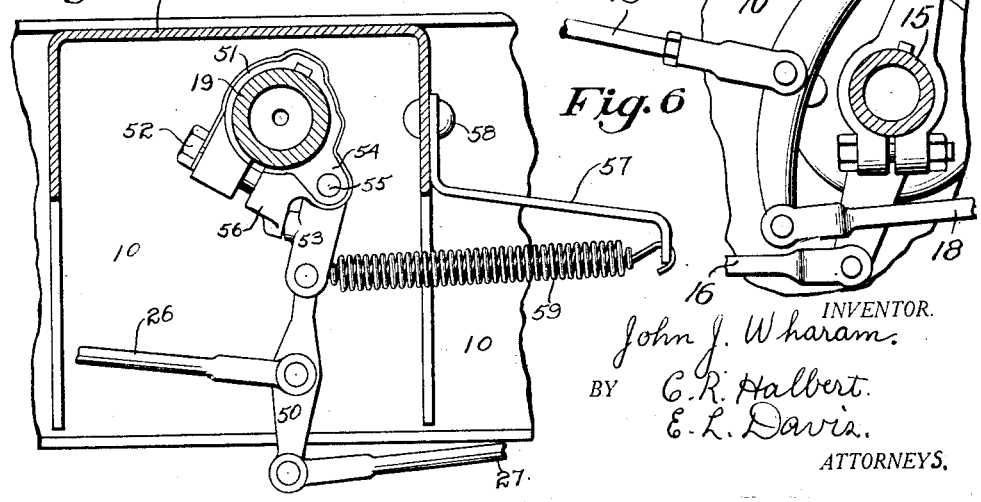
INVENTOR.
John J. Wharam.
BY C. R. Halbert.
E. L. Davis.
ATTORNEYS.

Patented Apr. 1, 1930

1,752,516

UNITED STATES PATENT OFFICE

JOHN J. WHARAM, OF DETROIT, MICHIGAN, ASSIGNOR TO FORD MOTOR COMPANY, OF HIGHLAND PARK, MICHIGAN, A CORPORATION OF DELAWARE

BRAKE

Application filed September 10, 1927. Serial No. 218,619.

The object of my invention is to provide a brake of simple, durable, and inexpensive construction.

Still a further object of my invention is to provide a brake mechanism for automobiles which may be operated by the emergency lever, and which will further insure proper braking service under a variety of conditions. For instance, it has been found in the past that where a car has been stopped at a time when the brake drums thereof are hot, then that if the emergency brake be set and the brake drums cool, there may be a tendency on the part of the drums to shrink away from the brake so that the emergency brake might become ineffective through no fault of the user if and after the car has stood some time. The danger of such a situation is obvious.

In view of the foregoing it is the object of my invention to provide an emergency brake which will not be affected by the contraction of metals due to cooling.

Still a further object of my invention is to connect the emergency lever of an automobile through an equalizer with both expanding and contracting shoes or bands co-acting with the same brake drums whereby the emergency lever may simultaneously operate both internal and external shoes or bands to secure a very efficient emergency brake, and which will automatically equalize the pressure between the contracting and expanding shoes or bands so that if the drum changes size on account of change in temperature then that the two sets of shoes will still equally grip the drum to hold same from movement relative to the shoes.

With these and other objects in view, my invention consists in the arrangement, combination, and construction of the various parts of my improved device, as described in the specification, claimed in the claims, and illustrated in the accompanying drawings, in which:

Figure 1 shows a top or plan view of a chassis having a braking system constructed in accordance with my invention.

Figure 2 shows a vertical transverse sectional view taken on the line 2—2 of Figure 1.

Figure 3 shows a vertical longitudinal sectional view taken on the line 3—3 of Figure 1.

Figure 4 shows a similar view taken on the line 4—4 of Figure 1.

Figure 5 shows a similar view taken on the line 5—5 of Figure 1.

Figure 6 shows a similar view taken on line 6—6 of Figure 1.

Referring to the accompanying drawings, I have used the reference numeral 10 to indicate generally the side or longitudinal frame members of an automobile. An inverted channel cross section cross member 11 extends between the frame members 10.

A brake pedal 12 is connected by a suitable linkage 13 with an equalizer structure 14. This equalizer is constructed to operate a rockshaft 15 which in turn is connected by suitable arms and links 16 and 17 with the front wheel brakes of the vehicle. These front wheel brakes and their connections are not herein shown as their specific structure thereof forms no part of my invention. The equalizer 14 is connected by a link 18 to a second rockshaft 19 which in the form of device illustrated is mounted within the channel of the cross frame member 11. This rockshaft 19 has downwardly extending arms 20 at either end thereof, which are connected by links 21 with arms 22 which are mounted in the rear brake anchor plate 23 and are designed to operate the rear wheel internal brake shoes. The construction of the mechanism whereby the arms 22 are connected to the internal shoes and the internal shoes themselves are not here shown as such devices are well known and the specific construction thereof forms no part of my invention.

An emergency lever 24 is pivotally mounted at 25 to any suitable part of the automotive frame, and the lower end thereof is connected by a link 26 and the second link 27 to a pair of aligned rockshafts 28 which are suitably pivoted on the rear axle 29 of the vehicle. These shafts 28 have arms 30 extending upwardly therefrom at the inner end thereof whereby these arms may be connected by an equalizer bow 31 which in turn has its central portion pivotally connected with the link 27. The outer ends of the shafts 28 are connected with arms 32 which in turn are connected by links 33 to brake band operating arms 34, the latter arms being pivotally connected to operate the external or contracting brake bands 35. The arms 32 and consequently the brake bands 35 are urged into retracted position by a brake spring 36 which has one end connected to the arms 32 and the other end to a stud 37 which extends from the brake anchor plate 23.

A supplementary brake retracting spring 38 is secured to a bracket 39 mounted on the frame member 10 at one end and secured to an arm 20 at the other end. The brake operating rockshaft 19 in the form of device herein disclosed is hollow along its central portions as is illustrated in Figure 2 and the ends thereof are mounted in spherical bearings 40 as is illustrated in the same figure. Alemite fittings 41 are extended into bores 42 in said shaft which communicate with the spherical bearings 40 to insure lubrication thereof.

From the foregoing it will be seen that means are provided for operating the internal expanding brakes on the rear wheels from the foot pedal 12 and the external contracting brakes from the emergency lever 24. My object is to hook together the operating mechanism for the internal and external brakes by means of an equalizer and to connect this equalizer with the emergency lever so that when the emergency brake is applied, it will apply equally the external and internal brakes simultaneously to the same drums. In case the brake drums should be very hot at the time the emergency is applied and the car is allowed to stand for some time, then the equalizer will permit the internal brakes to contract with the brake drum as it cools, and will cause the external brakes to contract around the brake drum as it cools, so that a uniform pressure, both external and internal, will be uniformly applied to the brake drum when the emergency lever is applied even though the brake drums may change their diameter due to changes in the temperature thereof.

The following mechanism is used to accomplish my object. A split sleeve 43 is clamped by means of a screw 44 onto the rockshaft 19. This sleeve has an ear 45 extended therefrom. A link 46 is pivotally connected to the ear 45 at 47 and to the link 18 at 48. This link 46 is so arranged that when the brake pedal 12 is operated, then the link 18 will be pulled forward which in turn will pull the link 46 into engagement with the lug 49 on the sleeve 43 to cause the rockshaft 19 to rotate to apply the internal expanding brakes in the rear wheels.

The link 26 which is operated by the emergency lever 24 has its rear end connected to the center of an equalizer bow 50. The bottom of this equalizer bow 50 is pivotally connected to the forward end of the link 27 which operates the contracting brakes. A split sleeve 51 similar to the split sleeve 43 is clamped onto the rockshaft 19 rearwardly of the emergency lever 24 by the screw 52. A link 53 is pivotally connected to the ear 54 which extends from the sleeve 51 as at 55. A lug 56 extends downwardly from the sleeve 51 and forms a stop to limit the rotation in one direction of the link 53 relative to the rockshaft 19. The lower end of the link 53 and the upper end of the equalizer bow 50 are pivotally connected together. Brackets 57 are riveted at 58 to the cross frame member 11 in position so that springs 59 may be fastened at one end to the bracket 57 and at the other end to the link 53 so that these springs 59 may tend to move the brake operating parts to their retracted position. One spring 59 is connected with the link 53 to pull the emergency lever to its retracted position and the second spring 59 is connected with the link 46 to return the brake pedal 12 to its retracted position. The return of the foot pedal 12 is adjustably limited by a bracket 60 which is riveted at 61 to the cross frame member 11 and extends downwardly to position opposite the rear end of the link 18. A stop screw 62 extends to the bracket 60 at this point and is held in its adjusted position by a lock nut 63 so that the retracted position of the link 18 and consequently the foot pedal 12 may be controlled.

It will thus be seen that if the emergency 24 is operated, it will pull forward the link 26 thereby pulling the equalizer bow 50 forward and consequently applying a pressure at the ends of that equalizer bow adapted to pull forward the link 27 and the link 53 with an equalized pressure. Pulling forward the link 27 contracts the external brakes of the rear wheels and pulling forward of the link 53 rotates the rockshaft 19 to apply the expanding brakes on the rear wheel. In other words operation of the emergency lever 24 pulls the equalizer bow 50 to apply both the internal and external brakes on the rear wheel. It will be seen that the link 46 can swing around on its pivot 45 when the shaft 19 is rotated so that the position of the foot pedal 12 will not be affected when the emergency lever is operated to apply four rear wheel brakes. On the other hand when the foot pedal 12 is depressed to rotate the rockshaft 19 to apply the expanding brakes in the rear wheel, then the link 53 can swing on its pivot 55 so that the emergency lever 24 will not have its position affected by the operation of the brake pedal 12.

From the foregoing it will be seen that I am enabled by my improved braking system to apply the four expanding brakes on the front and rear wheels of an automobile by means of the foot pedal 12. By the emergency lever I am enabled to apply an equal pressure to both the expanding and contracting brakes of the rear wheel to thereby secure an extremely efficient emergency brake. It will be noted that the rockshaft 19 is very substantially constructed so that there is practically no danger that it will break. So long as this shaft does not break and at least one of the rear wheel expanding brakes remains in operation, it will be seen that the equalizer bow 50 will insure the application of at least three brakes to the rear wheel whenever the emergency lever is applied. In other words any normal breakage of the brake parts would only affect the links connecting one of the brakes and one of the rear wheels and the remaining three brakes would be applied even though one such linkage should for any reason become inoperative.

The advantages of my improved brake have been pointed out in the course of this specification, but it should be especially mentioned by this system I am enabled to secure four brakes for the service brakes and four brakes for the emergency brake. Of these six brakes used, the internal expanding brakes on the rear wheel are the only brakes which are common. Ordinarily the emergency brake is only used for holding the car stationary so that there will be no appreciable wear on these expanding brakes on the rear wheels as compared with the brakes used on the front wheels. When however, it is desired to apply the emergency brake, the four rear wheel brakes are all applied simultaneously with an equal pressure thereby securing a very efficient emergency brake.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In a brake system, a vehicle having a frame, a pair of rockshafts thereon, said rockshafts being adapted to apply respectively the front and rear wheel brakes of the vehicle, expanding and contracting brakes mounted on the rear wheels, a foot pedal mounted on said frame, means for operatively connecting the foot pedal with both of said rockshafts to thereby simultaneously apply front and rear wheel brakes, an emergency lever mounted on said frame, and means for operatively connecting said emergency lever with both the external and internal rear wheel brakes to simultaneously apply both said sets of brakes on the rear wheels.

2. In a braking system, a vehicle having a frame, a pair of spaced rockshafts in said frame adapted to apply respectively the front and rear wheel brakes for the vehicle, a foot pedal mounted on said frame, means for operatively connecting said foot pedal with said rockshafts to simultaneously operate same, an emergency lever, mounted on said frame, expanding and contracting brakes on the rear wheels of said vehicle, and means for operatively connecting said emergency lever with both the expanding and contracting brakes of the rear wheels through an equalizer to simultaneously apply both sets of said brakes with an equalized pressure.

3. In a brake system, a vehicle having front and rear wheel brake drums, a brake for each of the front brake drums, an expanding and a contracting brake for each of the rear brake drums having an equalizer operatively connected therebetween, a foot pedal, means for operatively connecting the foot pedal with the front brakes and one set of the rear brakes, a hand lever, and means for operatively connecting said hand lever with both sets of the rear brakes through said equalizer.

4. In a brake system, a vehicle having front and rear wheel brake drums, an expanding brake for each of the front brake drums, an expanding brake and a contracting brake for each of the rear brake drums having an equalizer operatively connected therebetween, a foot pedal arranged to operate both pairs of said expanding brakes, and a hand lever arranged to operate both pairs of said rear brakes through said equalizer.

5. In a brake system, a vehicle having front and rear wheel brake drums, an expanding brake for each of the front brake drums, an expanding brake and a contracting brake for each of the rear brake drums, an equalizer operatively connected between the two sets of expanding brakes, a second equalizer operatively connected between the rear set of expanding brakes and the set of contracting brakes, a foot pedal arranged to operate both pairs of said expanding brakes through the first mentioned equalizer, and a hand lever arranged to operate said rear expanding brake and said contracting brake through the second mentioned equalizer.

JOHN J. WHARAM.